United States Patent [19]

Bachem et al.

[11] Patent Number: 4,737,576

[45] Date of Patent: Apr. 12, 1988

[54] BASIC POLYCONDENSATES

[75] Inventors: Henning Bachem, Cologne; Wolf-Dieter Schröer, Leverkusen, both of Fed. Rep. of Germany

[73] Assignee: Bayer Aktiengesellschaft, Leverkusen, Fed. Rep. of Germany

[21] Appl. No.: 24,502

[22] Filed: Mar. 11, 1987

[30] Foreign Application Priority Data

Mar. 25, 1986 [DE] Fed. Rep. of Germany ....... 3609985

[51] Int. Cl.$^4$ .............................................. C08G 73/00
[52] U.S. Cl. .................................... 528/405; 528/422; 162/164.3; 8/196
[58] Field of Search .............................. 528/405, 422

[56] References Cited

U.S. PATENT DOCUMENTS

| 3,738,945 | 6/1973 | Panzer et al. | 528/405 |
| 3,819,541 | 6/1974 | Longoria et al. | 528/405 |
| 4,482,667 | 11/1984 | Willis et al. | 528/405 X |

*Primary Examiner*—Earl Nielsen
*Attorney, Agent, or Firm*—Sprung Horn Kramer & Woods

[57] ABSTRACT

Basic polycondensates which are obtainable by reacting
A. a reaction product of
  1. a dihalogenohydrocarbon and/or a dihalogenoalkyl ether and
  2. a polyamine which contains two terminal primary and/or secondary and at least one internal tertiary amino group, which amino groups can also be part of a ring,
in a molar ratio of 0.7:1 to 1.8:1 with
B. an epihalogenohydrin or 1,3-dihalogeno-2-propanol in a molar ratio of 0.2 to 5.0 moles of B per mole of base nitrogen in A, find utility for treating fibre materials which contain hydroxyl or amide groups before or after dyeing or printing and as auxiliaries in papermaking.

7 Claims, No Drawings

BASIC POLYCONDENSATES

The invention relates to basic polycondensates which are obtainable by reacting
A. a reaction product of
  1. a dihalogenohydrocarbon and/or a dihalogenoalkylether and
  2. a polyamine which contains two terminal primary and/or secondary and at least one internal tertiary amino group, which amino groups can also be part of a ring,
  in a molar ratio of 0.7:1 to 1.8:1 with
B. an epihalogenohydrin or 1,3-dihalogeno-2-propanol in a molar ratio of 0.2 to 5.0 moles of B per mole of base nitrogen in A,
to their preparation and to their use for treating fibre materials which contain hydroxyl or amide groups before or after dyeing or printing and as auxiliaries in papermaking.

German Offenlegungsschrift No. 2,747,358 describes water-soluble, cationic polycondensates formed by reacting such polyamines, polyamides, polyurethanes and/or polyureas as contain secondary and/or tertiary amino groups with bifunctional compounds, such as α,ω-alkyl dihalides, epihalogenohydrins or ω-halogenocarbonyl halides, and their use for aftertreating reactive dyeings on cellulose materials.

European patent application EP No. 0,002,474 describes water-soluble polycondensates which are prepared by reacting polyamideamines or polyalkylenepolyamines with dihalogenoalkanes, epichlorohydrin or bis-epoxy compounds. They improve the retention of fillers, fibres and pigments, and the drainage acceleration in papermaking.

French patent specification No. 1,543,136 describes the reaction of polyamideamines with α,ω-dihalogen or polyhalogen compounds and further condensation with epichlorohydrin to improve the wet and dry strength improving of paper.

German patent specification No. 2,364,444, U.S. Pat. No. 4,129,528 and British patent specification No. 1,096,964 describe cationic resin formulations for increasing the wet strength of cellulose substrates or as flocculants, which are accessible by reacting a dihalogenoalkane and a polyalkylenepolyamine having primary and secondary amino groups and further condensation with epichlorohydrin.

German Offenlegungsschrift No. 3,446,282 discloses aftertreatment agents for dyed cotton fibres, which are prepared from low molecular weight polyalkylenepolyamines by reaction with epichlorohydrin.

Preferred basic polycondensates are obtainable by reacting
A. a reaction product of
  1. a dihalogenohydrocarbon of the formula $$X-\underset{R}{M}-X \qquad (I)$$

in which
X denotes halogen,
R denotes hydrogen or an optionally hydroxyl-substituted $C_1$-$C_4$-alkyl radical and
M denotes $C_2$-$C_6$-alkylene, $C_4$-$C_6$-alkenylene, cyclohexylene or xylylene, and/or
a dihalogenoalkyl ether of the formula

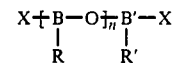

in which
X denotes halogen,
R and R' independently of each other denote hydrogen, hydroxyl or an optionally hydroxyl-substituted $C_1$-$C_4$-alkyl radical,
B and B' independently of each other denote a $C_2$ to $C_6$-alkylene radical and
n denotes 1 or 2, and
  2. an amine of the formulae

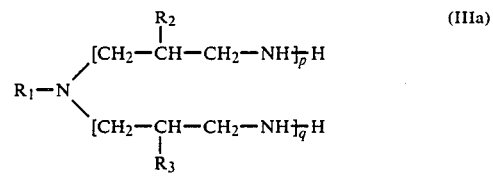

and/or

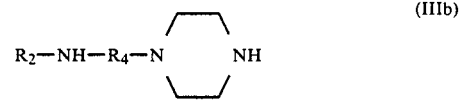

in which
$R_1$ stands for an optionally hydroxyl- or amino-substituted $C_1$ to $C_{18}$-alkyl radical,
$R_2$ and $R_3$ independently of each other stand for hydrogen or methyl,
$R_4$ stands for $C_2$-$C_4$-alkylene and
p and q stand for a whole number from 1 to 5,
in a molar ratio of 0.7:1 to 1.8:1, preferably 0.9:1 to 1.5:1, with
B. an epihalogenohydrin or 1,3-dichloro-2-propanol in a molar ratio of 0.2 mole to 5.0 moles, preferably 1.0 mole to 3.0 moles, of B per mole of base nitrogen in A.

The basic polycondensates according to the invention. are water-soluble and preferably not gellike. Their aqueous solutions of solids content 5 to 50% by weight, preferably 10 to 30% by weight, have a viscosity of 10 to 600 mPas, preferably 20 to 300 mPas.

The basic polycondensates are preferably prepared in an aqueous medium. The starting components 1. and 2. are made to react by known processes at pH values above 6 and temperatures between 20° and 150° C., at 0.5 to 50 bar, preferably 1 to 8 bar. The reaction has ended when a sample of the mixture in the form of a 10% strength, aqueous solution has at 25° C. a viscosity of at least 15 mPas.

In this connection, it is frequently advantageous to add the dihalogen compound a little at a time until the desired viscosity is obtained. The pH value is prevented from dropping below 6 by adding a base, such as 10 N NaOH or aminoethylpiperazine. The solids content of the precursors A is 10 to 60% by weight, preferably 20 to 50% by weight, and is set by diluting with solvents.

In general the precursors A. are characterized by a minimum molecular weight of 1000, the upper limit being defined by the condition of solubility, i.e. the number of solubilizing groups and the parent polyamine or the dihalogen compound. They contain essentially linear or branched structural segments and, depending on the polyamine and dihalogen compound, can also contain cyclic units, for example of the piperazine type when the component used is aminoethylpiperazine.

The further reaction of precursors A. with B. is effected by methods known per se. For instance, a compound B. is made to act on a precursor A. by stirring an aqueous, approximately 20 to 50% strength solution or emulsion of the two components at temperatures between 25° and 95° C., preferably 40° and 85° C., until a sample of reaction mixture in the form of a 10% strength, aqueous solution has at 25° C. a viscosity of 10 to 600 mPas, preferably 20 to 100 mPas.

If the viscosity increases too much in the course of the condensation, the reaction mixture is diluted by adding a solvent, preferably water. Depending on the reaction conditions—temperature and concentration—the condensation reaction is terminated after 30 minutes to 6 hours at pH values of 2 to 6, preferably 2 to 5, by adding an inorganic or organic acid, such as hydrochloric acid, sulphuric acid, formic acid or acetic acid. By diluting with water the solids content is set to 10 to 30% by weight. The reactions are preferably carried out in water; it is likewise possible to use other polar solvents, such as ethylene glycol, diethylene glycol, triethylene glycol, polyethylene glycol, glycerole, isopropanol, ethanol, methanol, dimethylformamide, dimethyl sulfoxide, N-methylpyrrolidone or mixtures thereof with water.

In this way, ready-for-sale, aqueous solutions having a long shelf life are obtained. If desired, the solutions can also be dewatered. The polycondensates according to the invention still contain reactive epoxy or chlorohydrin groups. As a result they are capable of entering a chemical reaction with the textile substrate or paper, for the treatment of which they can be used.

Specific examples of dihalogenohydrocarbons (I) are: 1,2-dichloroethane, 1,2-dibromoethane, 1-chloro-2-bromoethane, 1,2-dichloropropane, 1-chloro-3-bromopropane, 1,2-dichlorobutane, 1,3-dichloropropane, 1,4-dichlorobutane, 1,4-dichlorobut-2-ene, 1,5-dichloropentane, 1,6-dichlorohexane, 1,4-cyclohexylene dichloride and 1,4-xylylene dichloride.

Specific examples of dihalogenoalkyl ethers (II) are: bis-($\beta$-chloroethyl) ether, bis-($\beta$-chloroisopropyl) ether, bis-($\beta$-chloropropyl) ether, bis-(4-chlorobutyl) ether, bis-(3-chloro-2-hydroxypropyl) ether and ethylene glycol bis-($\beta$-chloroethyl) ether.

Representatives of amines (IIIa) and (IIIb) are: Methyl-bis-(3-aminopropyl)-amine, ethyl-bis-(3-aminopropyl)-amine, 2-hydroxyethyl-bis-(3-aminopropyl)-amine, n-butyl-bis-(3-aminopropyl)-amine and aminoethylpiperazine.

The preferred compound B. is epichlorohydrin.

The basic polycondensates according to the invention find utility for treating, before or after dyeing or printing, fibre materials which contain hydroxyl or amide groups, for example which are based on natural fibres such as cotton or wool, or on synthetic or cellulosic filaments or fibres such as polyamides and cellulose esters. They improve the wet fastness properties, for example the perspiration and wash fastness, of the fibre materials.

The new polycondensates are further suitable for use as auxiliaries in papermaking. They improve the fixation of pigment particles on coloured laminate papers and of sizing agents in the paper. They are applied in a known manner by, for example, adding the polycondensates in dilute aqueous solution to the suspension of papermaker's material. The amount of polycondensates is for example 0.005 to 0.5% by weight, relative to the dry weight of the paper. The preferred pH value is 4.0 to 8.0.

EXAMPLE 1

145.2 g of methyl-bis-(3-aminopropyl)-amine are introduced first, 87.5 g of molten p-xylylene dichloride (105° C.) are added at 80° C. with stirring in the course of 10 minutes, and the mixture is subsequently stirred for 2 hours. Then 49.5 g of 1,2-dichloroethane are added at 80°–85° C. in the course of 30 minutes, and the increasingly more viscous reaction mixture is diluted with 150 ml of water. This is followed by stirring at 75°–80° C. for a further 1¼ hours, diluting with water a little at a time, cooling down when the desired final viscosity is obtained, and degassing.

Solids content: 22.5% by weight
Viscosity: 154 mPas (25° C.)

EXAMPLE 2

697.4 g of methyl-bis-(3-aminopropyl)-amine and 1530 ml of water are introduced first, 475.0 g of 1,2-dichloroethane are then added at 120° C. in the pressure reactor in the course of 2 hours, and stirring is continued for 90 minutes. 2010 ml of water are then added dropwise, and the mixture is vented and degassed.

Viscosity: 92 mPas (25° C.)
Solids content: 22.0% by weight

EXAMPLE 3

To an initial charge of 697.4 g of methyl-bis-(3-aminopropyl)-amine and 1510 ml of water is added, at 120° C. in a pressure reactor, a mixture of 431.8 g of 1,2-dichloroethane and 133.2 g of 1,2-dochloropropane in the course of 3 hours, and condensation is continued at that temperature for a further 2 hours. Then the mixture is diluted with water, vented and degassed.

Viscosity: 110 mPas (25° C.)
Solids content: 22.5% by weight

EXAMPLE 4

To an initial charge of 290.6 g of methyl-bis-(3-aminopropyl)-amine and 75 ml of water is added at 80° C. a mixture of 148.5 g of 1,2-dichloroethane and 46.5 g of 1,6-dichlorohexane in the course of 2 hours. Stirring is continued at 90° C. for 5 hours, and 420 ml of water are added a little at a time.

Viscosity: 293 mPas (25° C.)
Solids content: 49.0% by weight

EXAMPLE 5

203.4 g of methyl-bis-(3-aminopropyl)-amine, 76.8 g of aminoethylpiperazine and 120 ml of water are introduced first. To the mixture are added dropwise at 80° C. in the course of 90 minutes 183.2 g of 1,2-dichloroethane, and stirring is continued at 90° C. for 8 hours. During this period, 300 ml of water are added a little at a time, and the mixture is then cooled down, diluted with water to 50% and degassed.

Viscosity: 68 mPas (25° C.)

EXAMPLE 6

270.0 g of the precursor described in Example 2 are introduced first in the form of a mixture with 249 ml of water, and 55.5 g (0.6 mol) of epichlorohydrin are added dropwise at 25°–30° C. in the course of 45 minutes. Stirring is continued at 30° C. for 1 hour, and the temperature is raised to 70°-80° C. Stirring is continued at that temperature for about 30 minutes, and a pH of 3 is set by means of a hydrochloric acid solution.

Viscosity: 86 mPas (25° C.)
Solids content: 19.0% by weight

EXAMPLE 7

To an initial charge of 205.0 g of the reaction product described in Example 3 and 245 ml of water are added at 25°-30° C. 27.8 g (0.3 mol) of epichlorohydrine in the course of 45 minutes. The mixture is subsequently stirred for 1 hour, heated to 70°-80° C. and allowed to become more viscous. On obtaining the desired viscosity, the pH value is adjusted by means of the hydrochloric acid solution to pH 2.

Viscosity: 68 mPas (25° C.)
Solids content: 15.1% by weight

EXAMPLE 8

The method of Example 7 is used to dilute an initial charge of 174.0 g of the precursor described in Example 4 with 300 ml of water and react with 18.5 g (0.2 mol) of epichlorohydrine to give a polymeric condensate.

Viscosity: 107 mPas (25° C.)
Solids content: 20.9% by weight

EXAMPLE 9

The method of Example 7 is used to react a mixture of 121.7 g of the precursor of Example 5 and 230 ml of water with 37.0 g (0.4 mol) of epichlorohydrine.

Viscosity: 103 mPas (25° C.)
Solids content: 24.8% by weight

EXAMPLE 10

A rinsed 4% strength cotton exhaust dye obtained with the dyestuff Direct Blue 98 (C.I. 23155) is impregnated at pH 7 on a pad-mangle with a cold (20° C.) solution which contains 5 g/l of the polymeric compound (100% strength material) of Example 6 in the course of 20 minutes. This is followed by fixing, without intermediate drying, at 80° C. for 3 minutes.

The fastness tests show a distinctly improved wash fastness of the aftertreated textile material in a 60° wash.

EXAMPLE 11

A rinsed 4% strength cotton exhaust dye obtained with a dye as described in German Auslegeschrift No. 1,544,559 Example 1 is treated for 20 minutes at pH 7 and 50° C. in a liquor ratio of 25:1 with an aqueous solution which contains 1.5% (relative to the dry weight of the substrate) of the polymeric compound (100% strength material) of Example 8. This is followed by rinsing with cold water and fixing at 150° C. for 5 minutes.

The aftertreatment has the effect of significantly improving the fastness level of the dyeing in the 40° wash and also the perspiration fastness.

We claim:

1. Basic polycondensates which are obtainable by reacting
A. a reaction product of
 1. a dihalogenohydrocarbon and/or a dihalogenoalkyl ether and
 2. a polyamine which contains two terminal primary and/or secondary and at least one internal tertiary amino group, which amino groups can also be part of a ring, in a molar ratio of 0.7:1 to 1.8:1 with
B. an epihalogenohydrin or 1,3-dihalogeno-2-propanol in a molar ratio of 0.2 to 5.0 moles of B per mole of base nitrogen in A.

2. Basic polycondensates according to claim 1, which are obtainable by reacting.
A. a reaction product of
 1. a dihalogenohydrocarbon of the formula

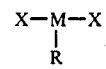

in which
X denotes halogen,
R denotes hydrogen or an optionally hydroxyl-substituted $C_1$-$C_4$-alkyl radical and
M denotes $C_2$-$C_6$-alkylene, $C_4$-$C_6$-alkenylene, cyclohexylene or xylylene, and/or
a dihalogenoalkyl ether of the formula

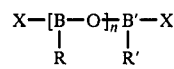

in which
X denotes halogen,
R and R' independently of each other denote hydrogen, hydroxyl or an optionally hydroxyl-substituted $C_1$-$C_4$-alkyl radical,
B and B' independently of each other denote a $C_2$ to $C_6$-alkylene radical and
n denotes 1 or 2, and
 2. an amine of the formulae

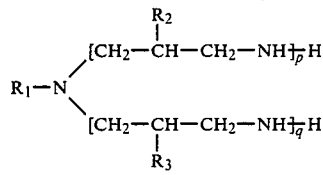

and/or

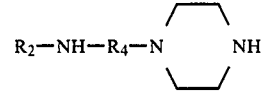

in which
$R_1$ stands for an optionally hydroxyl- or amino-substituted $C_1$ to $C_{18}$-alkyl radical,
$R_2$ and $R_3$ independently of each other stand for hydrogen or methyl,
$R_4$ stands for $C_2$-$C_4$-alkylene and
p and q stand for a whole number from 1 to 5,
in a molar ratio of 0.7:1 to 1.8:1, preferably 0.9:1 to 1.5:1, with
B. an epihalogenohydrin or 1,3-dichloro-2-propanol in a molar ratio of 0.2 mole to 5.0 moles, preferably 1.0 mole to 3.0 moles, of B per mole of base nitrogen in A.

3. Basic polycondensates according to claim 1, whose 5 to 50 percent strength by weight aqueous solutions have a viscosity of 10 to 600 mPas.

4. Basic polycondensates according to claim 1, in whose preparation 1,2-dichloroethane, 1,2-dichloropropane, 1-chlor-3-bromopropane, 1,6-dichlorohexane and/or 1,4-xylylene dichloride are used as dihalogenohydrocarbon.

5. Basic polycondensates according to claim 1, in whose preparation methyl-bis-(3-aminopropyl)-amine and/or aminoethyl piperazine are used as polyamine.

6. Basic polycondensates according to claim 1, in whose preparation epichlorohydrin is used as epihalogenohydrine.

7. Process for preparing basic polycondensates, characterized in that

A. a reaction product of
  1. a dihalogenohydrocarbon and/or a dihalogenoalkyl ether and
  2. a polyamine which contains two terminal primary and/or secondary and at least one internal tertiary amino group, which amino groups can also be part of a ring,
is reacted in a molar ratio of 0.7:1 to 1.8:1 with
B. an epihalogenohydrin or 1,3-dihalogeno-2-propanol in a molar ratio of 0.2 to 5.0 moles of B per mole of base nitrogen in A.

* * * * *